(12) United States Patent
Cassar et al.

(10) Patent No.: US 6,355,734 B1
(45) Date of Patent: Mar. 12, 2002

(54) RESIN-FORTIFIED SUGAR-BASED VINYL EMULSION COPOLYMERS AND METHODS OF PREPARING THE SAME

(75) Inventors: Scott E. Cassar, Holt, MI (US); David H. Fishman, Berkeley Heights, NJ (US); Ian J. McLennan, Lansing; Steven Bloembergen, Okemos, both of MI (US)

(73) Assignee: Ecosynthetix Inc., Lansing, MI (US)

( * ) Notice: Subject to any disclaimer, the term of this patent is extended or adjusted under 35 U.S.C. 154(b) by 0 days.

(21) Appl. No.: 09/378,076

(22) Filed: Aug. 20, 1999

(51) Int. Cl.⁷ .................. C08F 291/00; C09D 11/02; C09D 11/10
(52) U.S. Cl. .................. 525/243; 527/300; 527/311; 527/313; 527/314; 106/31.25; 106/31.68
(58) Field of Search .................. 525/243; 527/300, 527/311, 313, 314; 106/31.25, 31.68

(56) References Cited

U.S. PATENT DOCUMENTS

| | | | |
|---|---|---|---|
| 3,673,135 A | | 6/1972 | Blake et al. |
| 4,719,272 A | * | 1/1988 | Tsai et al. ................ 526/238.2 |
| 4,820,762 A | | 4/1989 | Tsaur |
| 5,580,940 A | | 12/1996 | Oosterhoff |
| 5,872,199 A | | 2/1999 | Bloembergen et al. |

OTHER PUBLICATIONS

David H. Fishman, et al., "Water–based Flexo: The VOC Challenge," *American Ink Maker*, Jan., 1990.
David H. Fishman, "Flexographic Printing Markets, Process & Inks," *American Ink Maker* Oct., 1995.
David H. Fishman, "Clear Overprint Coatings," *American Ink Maker*, Nov., 1996.

* cited by examiner

*Primary Examiner*—Jeffrey Mullis
(74) *Attorney, Agent, or Firm*—Quarles & Brady LLP

(57) ABSTRACT

A method of preparing a resin-fortified polymer emulsion is disclosed. In one embodiment, the method comprises polymerizing at least one monomer in the presence of a surfactant, an initiator, a resin and sugar-based vinyl monomer under emulsion polymerization reaction conditions effective for initiating polymerization, wherein an emulsion polymerization product is formed that comprises a sugar-based vinyl monomer. A composition comprising resin-fortified emulsion polymer comprising a sugar-based vinyl monomer, a resin and at least one emulsion polymerizable monomer is also disclosed. An ink comprising a pigment and a resin-fortified polymer emulsion comprising a sugar-based vinyl monomer, a resin and at least one emulsion polymerizable monomer is also disclosed.

6 Claims, No Drawings

RESIN-FORTIFIED SUGAR-BASED VINYL EMULSION COPOLYMERS AND METHODS OF PREPARING THE SAME

CROSS-REFERENCE TO RELATED APPLICATIONS

STATEMENT REGARDING FEDERALLY SPONSORED RESEARCH OR DEVELOPMENT

BACKGROUND OF THE INVENTION

In general, the present invention relates to resin-fortified emulsion polymer compositions comprising a sugar-based vinyl monomer.

Emulsion Polymers

High molecular weight emulsion polymers are useful in the coatings and inks industry. However, high molecular weight emulsion polymer technology has some drawbacks. Problems associated with high molecular weight emulsion polymer systems include wetting and adherency problems, mechanical instability, freeze/thaw instability and inability to biodegrade or be repulped.

U.S. Pat. No. 4,151,143, issued to Blank, et al., discloses a surfactant-free polymer emulsion coating composition and a method for preparing the same. U.S. Pat. No. 4,179,417, issued to Sunada, et al., discloses a composition for water based paints containing a water soluble resin and a water dispersible polymer which are employed as water based paints and can optionally contain a cross linking agent. Canadian Pat. No. 814,528, issued Jun. 3, 1969, discloses low molecular weight alkali soluble resin, resin cuts and method of their preparation and purification. U.S. Pat. No. 4,820,762 discloses resin-fortified emulsion polymers that are created by addition of a low molecular weight support resin during the emulsion polymerization process.

Sugar-based Vinyl Monomers

U.S. Pat. No. 5,827,199 discloses copolymers prepared from alkyl polyglycoside maleic acid esters (sugar monomer) and vinyl monomers. These water borne copolymers contain sugar units in their polymeric structure introduced by way of the bifunctional sugar monomer. Acrylic copolymers containing around 10% sugar monomer have been found to be noninterfering in paper recycling, while copolymers containing at least 40% sugar monomer are biodegradable under composting conditions as per ASTM D5338 (see Adhesives Age 41(2):24, 1998).

BRIEF SUMMARY OF INVENTION

The resin-fortified emulsion polymers of the present invention provide suitable mechanical, physical and performance properties when compared to conventional emulsion polymers and represent an advance in emulsion polymerization technology. It is an object of the present invention to provide novel copolymers that are useful in biodegradable, repulpable inks, primers coatings, overprint coatings and related products used on paper and paperboard, synthetic and natural polymer films, metallized films and metal foils and sheets, as well as combinations thereof. These printed or decorated substrates could be used in packaging, publication, commercial printing, wallpaper, specialty and other related applications.

Briefly, in accordance with the present invention, a resin-fortified emulsion polymer is prepared by exposing a resin to an emulsion polymerization reaction mixture comprising a sugar-based vinyl monomer and other vinyl comonomers. The resin is a low molecular weight polymer and is soluble or dispersible in water or alkali solutions. The emulsion polymerization reaction mixture contains any monomers employed in emulsion polymerization reactions and additionally comprises a sugar-based vinyl monomer. The resulting resin-fortified emulsion polymers have enhanced performance for coatings, ink and graphic art applications and are recycling friendly.

DETAILED DESCRIPTION OF THE INVENTION

The present invention is both a method of obtaining a resin-fortified emulsion polymer comprising a sugar-based vinyl monomer and the polymer itself. When used herein the term "emulsion polymer" refers to any polymer prepared by emulsion polymerization. Such polymers are formed by the polymerization of one or more monomers capable of undergoing free radical emulsion polymerization. When used herein the term "resin" encompasses all low molecular weight resins of from about 500 to about 20,000, and preferably about 500 to 10,000, number average molecular weight which are soluble or dispirsible in water or alkali.

In practicing the present invention, a solution polymer support resin is exposed to an emulsion polymerization reaction mixture during the emulsion polymerization reaction.

Typically, the solution polymer support resin is first added to a reactor under an inert atmosphere. Water, surfactant and buffer are then added with agitation and brought to reaction temperature. A pre-emulsion is prepared separately by mixing together water, surfactant and the monomers including the sugar-based vinyl monomer. The pre-emulsion step is preferred because the sugar-based vinyl monomer may not be soluble in the monomers and may not form a single homogenous phase. A surfactant is required to cosolubilize the monomers and allow a homogenous feed to be fed to the reactor during the starve-fed polymerization process to ensure a random incorporation of the monomers. The charge initiator, preferably a water-soluble initiator, is added to the reactor followed immediately by the start of the pre-emulsion feed, which is fed to the reactor over an extended period of time, typically 1–2 hours. This is what is termed a "starve-fed" emulsion process. Base (typically ammonium hydroxide, 30 wt % in water) is added simultaneously with the pre-emulsion to keep the emulsion slightly basic. A second initiator feed is added to the emulsion at the finish of the pre-emulsion feed. A final initiator feed is added one hour later as a chaser to scavenge any unreacted monomer. The emulsion is allowed to react an additional hour before it is cooled to room temperature.

In conducting the present emulsion polymerization reaction, standard emulsion polymerization techniques are employed with the addition of a pre-emulsion prepared by separately mixing together water, surfactant and the monomers and the addition of base along with the pre-emulsion to keep the emulsion slightly basic.

Standard nonionic and anionic surfactants are employed in the reaction. Advantageously, the reaction is conducted at an elevated temperature ranging from about 60° to about 100° C., at ambient pressure and under an inert atmosphere such as nitrogen. The reaction mixture is maintained under agitation employing standard mixing techniques.

Before the resin is mixed with the emulsion polymerization reaction mixture there must be a polymeric (or steric) stabilizer present in the reaction mixture to prevent coagulation of the emulsion particles. The stabilizer can be any of the conventional nonionic surfactants such as ethoxylated alkylphenols including ethoxylated nonylphenol having at least 20 ethylene oxide units, ethoxylated octylphenol having at least 20 ethylene oxide units or, alternatively, functional monomers such as acrylic acid, methacrylic acid or polyethylene glycol monomethacrylate. The stabilizer is added to the reaction mixture prior to resin addition and usually in amounts ranging from about 1 to about 8 percent by weight of the reaction mixture and preferably from about 2 to about 4 weight percent.

Suitable low molecular weight support resins employed in the practice of the present invention include any solution or bulk polymerized polymers prepared from ethylenically unsaturated monomers such as olefins, mono vinylidene aromatics, alpha, beta-ethylenically unsaturated carboxylic acids and esters thereof, and ethylenically unsaturated dicarboxylic anhydrides. They are known materials and are prepared employing standard solution polymerization techniques. Preferably, the support resins are prepared in accordance with the teachings of U.S. Pat. No. 4,414,370, U.S. Pat. No. 4,529,787 and U.S. Pat. No. 4,456,160 all of which are incorporated herein by reference.

Other suitable commercially available resins include water dispersed or water dispersible aliphatic polyurethanes such as Spensol L52 an aliphatic polyurethane commercially available from Reichhold Chemical, Inc., and water dispersible silicone ethylene oxide copolymers such as FF400, a water dispersible silicone-ethylene oxide copolymer commercially available from Dow Corning. These and other similar resins can be used especially where the desirable characteristics of the resin, i.e., flexibility, slip properties, durability, etc., are required. These resins should be low molecular weight with a number average molecular weight of from about 500 to 20,000.

Preferred support resins include those resins containing styrene (ST), alpha methylstyrene (AMS), acrylic acid (AA) and mixtures thereof. An especially preferred support resin is a ST/AA copolymer containing three parts ST and one part AA and which has a number average molecular weight of from about 1,000 to about 6,000 and, preferably, from about 2,000 to about 4,000.

Suitable monomers employed in the preparation of the support resins include acrylic acid, methacrylic acid, styrene, alpha-methylstyrene, hydroxyethylmethacrylate and esters of acrylic acid and methacrylic acid.

As noted above, the resins useful in the process of the present invention should be low molecular weight with a number average molecular weight in the range of from about 500 to about 20,000, preferably about 500 to about 10,000 and optimally about 2,000 to about 4,000. Also the resins must be water soluble or water dispersible either as is or in an alkaline medium such as ammonium hydroxide.

The monomers employed in the preparation of the present emulsion polymers are any monomers used in emulsion polymerization reactions. Suitable monomers include ethylenically unsaturated monomers such as olefins, mono vinylidene aromatics, alpha, beta ethylenically unsaturated carboxylic acids and esters thereof, ethylenically unsaturated dicarboxylic anhydrides and halo substituted olefinics. Preferred monomers include methylmethacrylate (MMA), styrene (ST), alphamethylstyrene (AMS), acrylic acid (AA), methacrylic acid (MAA), butylmethacrylate (BMA), butylacrylate (BA), 2-ethylhexylacrylate (2-EHA), ethylacrylate (EA), hydroxyethylacrylate (HEA) and hydroxyethylmethacrylate (HEMA).

Suitable sugar-based vinyl monomers are described in U.S. Pat. 5,872,199. It is preferable for the monomer to have an average degree of polymerization (DP) equal to 1.2 to 2.0, and an average degree of substitution (DS) equal to 2.

When used herein, the term "sugar-based vinyl monomer" refers to an alkyl polyglycoside maleic acid ester with the formula

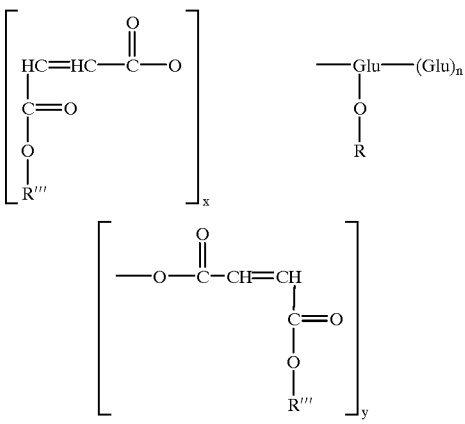

wherein Glu is a saccharide moiety; R is selected from the group consisting of a C1 to C30 alkyl or mixtures thereof; R''' is selected from the group consisting of hydrogen, a C1 to C30 alkyl or a mixture thereof, n is an integer of 0 to 10; x and y are integers of 0 to 3 or 0 to 4, where the maximum value of 3 or 4 for x and y equals the number of hydroxyls on the Glu moiety, but not both x and y are zero.

Especially preferred is the compound wherein Glu is derived from α-D-glucose. Also especially preferred is the compound wherein R is selected from the group consisting of a C3 to C8 alkyl group or mixture thereof. We especially envision as useful compounds where R''' is selected from the group consisting of a hydrogen, H, a C8 to C18 alkyl group or mixture thereof and a compound prepared by estrification of alkyl polyglycoside maleic acid with a primary C1 to C30 alcohol or mixture thereof.

The sugar-based vinyl monomer was prepared by the method provided in Example 5 described in U.S. Pat. No. 5,872,199.

The support resin is added to the present emulsion polymerization reaction in amounts sufficient to modify the flow characteristics of the resulting emulsion polymer. Amounts ranging from about 2 to about 50 weight percent or more based on the total weight of solids in the emulsion polymerization reaction mixture are usually effective. Advantageously the support resin is added in amounts greater than about 5% and preferably greater than about 10% by total weight of solids in the emulsion reaction mixture. The optimum amount of support resin and sugar-based vinyl monomer to be added during the emulsion polymerization reaction will depend on a variety of factors, such as, the particular makeup of the support resin, the particular makeup of the sugar-based emulsion polymer, the end use application for the emulsion polymer, recyclability requirements of the emulsion polymer, and the environment in which the emulsion polymer will be used. One skilled in the art can readily determine the optimum amount of support resin and sugar-based vinyl monomer to be used in a particular application by conducting routine experiments.

A suitable polymer of the present invention can be designed to be recycling friendly, having either biodegradability or repulpability characteristics or both. The amount of sugar-based vinyl monomer can be optimized to provide the most desirable biodegradable and repulpable characteristics. Preferably, the amount of sugar-based vinyl monomer should be 2–40 wt %.

The present invention is also an ink, preferably comprising a pigment and a fortified emulsion polymer comprising a sugar-based vinyl monomer, a resin and at least one emulsion-polymerizable monomer. Preferred formulations are disclosed below in the Examples.

The following examples illustrate the practice of the present invention but should not be construed as limiting its scope.

EXAMPLES

The following experiments were performed to characterize a resin-fortified emulsion comprising sugar-based vinyl monomers:

TABLE 1

| Sample # | 1 | 2 | 3 | 4 | 5 | 6 | 7 | 8 | 9 | 10 |
|---|---|---|---|---|---|---|---|---|---|---|
| Solution Polymer (Resin) | X | X | X | X | X | X | X | X | | |
| Sugar-based Vinyl Monomer | | X | | X | | X | | X | | X |
| Low & High $T_g$ Monomer | X | X | X | X | | | | | X | X |
| Low $T_g$ Monomer | | | | | X | X | | | | |
| High $T_g$ Monomer | | | | | | | X | X | | |

Sample 1 was a control fortified emulsion copolymer prepared from a monomer mixture consisting of 2-ethylhexyl acrylate and methyl methacrylate that was added to a solution polymer and polymerized with a free radical initiator. A surfactant was added to the monomer mixture to prepare stable pre-emulsions required for compatabilization of the sugar-based vinyl monomer. Sample 2 was similar to sample 1, but contained sugar-based vinyl monomer. Base was added to the pre-emulsions of samples, 2, 4, 6, 8 and 10 to neutralize the sugar-based vinyl monomer.

Samples 3 and 4 used an alternate low $T_g$ monomer, butyl acrylate, in place of 2-ethylhexyl acrylate.

Samples 5 and 6 used only butyl acrylate, and samples 7 and 8 used only methyl methacrylate. Base was added directly to the reaction mix concurrently with the pre-emulsion in samples 6 and 8.

Control samples 9 and 10 were non-fortified emulsions because they did not contain solution polymer resin. They were made using butyl acrylate and methyl methacrylate.

Example 1

Resin-fortified Emulsion Polymer 1

The initiator feed, monomer mix, and chaser solutions listed in Table 2, were prepared by mixing their respective components. Joncryl-584 (J-584) solution resin was added to a (1 L) reactor and heated to 80° C. under a low stream of $N_2$. It was stirred for 15 minutes before the other pre-mixed components of the charge (water, surfactant and buffer) were added. This mixture was allowed to equilibrate to 80° C. over a period of 10 minutes. The $N_2$ purge was shut off and the initiator was injected with stirring. Immediately after the initiator addition, the monomer feed was started and added to the reactor over 2 hours. After an additional 15 minutes, the first chaser solution was added over a period of 10 minutes. The mixture was held at 80° C. for another hour before the second chaser solution was added, again over a period of 10 minutes. The latex was allowed to post-polymerize for an hour before it was cooled to room temperature.

TABLE 2

Resin Fortified Emulsion Polymer Recipes - components in grams

| | Charge | | | | Catalyst | | Monomer Mix/Pre-Emulsion | | | | | | | Base | Chaser 1 | | Chaser 2 | |
|---|---|---|---|---|---|---|---|---|---|---|---|---|---|---|---|---|---|---|
| | 584 | L61 | Buf | H$_2$O | H$_2$O | APS | H$_2$O | 825 | EHA | BA | MMA | SBV | OH | OH | H$_2$O | APS | H$_2$O | APS |
| 1 | 189 | 10.4 | 0.83 | 54.08 | 3.45 | 0.83 | — | — | 75.76 | — | 56.28 | — | — | — | 4.37 | 0.42 | 4.58 | 0.21 |
| 2 | 189 | 8.42 | 0.83 | 21.07 | 3.45 | 0.83 | 29.33 | 5.66 | 68.18 | — | 50.65 | 13.2 | 5.0 | — | 4.37 | 0.42 | 4.58 | 0.21 |
| 3 | 188 | 8.38 | 0.83 | 20.07 | 3.44 | 0.83 | 30.12 | 5.63 | — | 76.41 | 56.76 | — | — | — | 4.35 | 0.41 | 4.56 | 0.21 |
| 4 | 188 | 8.38 | 0.83 | 20.07 | 3.44 | 0.83 | 26.19 | 5.63 | — | 67.90 | 50.44 | 13.15 | 5.62 | — | 4.35 | 0.41 | 4.56 | 0.21 |
| 5 | 188 | 8.38 | 0.83 | 20.07 | 3.44 | 0.83 | 30.12 | 5.63 | — | 133.2 | — | — | — | — | 4.35 | 0.41 | 4.56 | 0.21 |
| 6 | 188 | 8.38 | 0.83 | 20.07 | 3.44 | 0.83 | 26.19 | 5.63 | — | 118.3 | — | 13.15 | — | 5.62 | 4.35 | 0.41 | 4.56 | 0.21 |
| 7 | 188 | 8.38 | 0.83 | 20.07 | 3.44 | 0.83 | 30.12 | 5.63 | — | — | 133.17 | — | — | — | 4.35 | 0.41 | 4.56 | 0.21 |
| 8 | 188 | 8.38 | 0.83 | 20.07 | 3.44 | 0.83 | 26.19 | 5.63 | — | — | 118.33 | 13.15 | — | 5.62 | 4.35 | 0.41 | 4.56 | 0.21 |

584 — J-584 Solution 30% solids in water (S C Johnson)
L61 — Pluronic L61 (non-ionic; BASF)
Buf — sodium bicarbonate
H$_2$O — deionized water
APS — ammonium persulfate
825 — Emulgator 8255 (anionic; BASF)
EHA — 2-ethylhexyl acrylate
BA — butyl acrylate
MMA — methyl methacrylate
SBV — sugar-based vinyl monomer
OH — ammonium hydroxide 30%

Example 2

Resin-fortified Emulsion Polymer 2–5,7

The initiator feed, pre-emulsion, and chaser solutions listed in Table 2 were prepared by mixing their respective components. The J-584 resin solution was added to a (1 L) reactor and heated to 80° C. under a low stream $N_2$. It was stirred for 15 minutes before the other pre-mixed components of the charge (water, surfactant and buffer) were added. This mixture was allowed to equilibrate to 80° C. over a period of 10 minutes. The $N_2$ purge was shut off and the initiator was injected with stirring. Immediately after initiator addition, the pre-emulsion feed was started and added to the reactor over 2 hours. After an additional 15 minutes, the first chaser solution was added over a period of 10 minutes. The mixture was held at 80° C. for another hour before the second chaser solution was added, again over a period of 10 minutes. The latex was allowed to post-polymerize for an hour before it was cooled to room temperature.

Example 3
Resin-fortified Emulsion Polymer 6,8

The initiator feed, pre-emulsion, and chaser solutions listed in Table 2 were prepared by mixing their respective components. The J-584 solution resin was added to a (1 L) reactor and heated to 80° C. under a low stream $N_2$. It was stirred for 15 minutes before the other pre-mixed components of the charge (water, surfactant and buffer) were added. This mixture was allowed to equilibrate to 80° C. over a period of 10 minutes. The $N_2$ purge was shut off and the initiator was injected with stirring. Immediately after the initiator addition, the pre-emulsion feed was started and added to the reactor over 2 hours. As opposed to adding base in the pre-emulsion, base was added separately over the same time period of addition. After an additional 15 minutes, the first chaser solution was added over a period of 10 minutes. The mixture was held at 80° C. for another hour before the second chaser solution was added, again over a period of 10 minutes. The latex was allowed to post-polymerize for an hour before it was cooled to room temperature.

Example 4
Emulsion Polymer 9, 10

The charge, initiator charge, pre-emulsion, initiator feed and chaser solutions listed in Table 3 were prepared by mixing their respective components. The charge was added to a (1 L) reactor and heated to 80° C. under a low steam of $N_2$. It was stirred for 15 minutes, following which 3 wt % of the pre-emulsion was added as a seed to the charge and stirred for 5 minutes. The $N_2$ purge was shut off and the initiator charge was injected with stirring. After 15 minutes, the pre-emulsion and initiator feeds were started and added to the reactor over 3 and 3½ hours respectively. After an additional 45 minutes, the oxidizing chaser solution was added followed by the reducing chaser solution which was delay added over a period of 30 minutes. The mixture was held at 80° C. for 15 minutes before it was cooled to room temperature.

TABLE 3

Emulsion Polymer Recipes - components in grams

| | Charge | | Init Cat | | Pre-Emulsion | | | | | Cat Feed | | Ox Chaser | | | Red Chaser | |
|---|---|---|---|---|---|---|---|---|---|---|---|---|---|---|---|---|
| | $H_2O$ | Buff | $H_2O$ | APS | $H_2O$ | 825 | BA | MMA | SBV | $H_2O$ | APS | $H_2O$ | APS | BHP | $H_2O$ | SFS |
| 9 | 70.9 | 0.5 | 5.6 | 0.1 | 51.0 | 10.1 | 134.6 | 100 | — | 19.6 | 0.79 | 3.27 | 0.098 | 0.094 | 3.27 | 0.131 |
| 10 | 70.9 | 0.5 | 5.6 | 0.1 | 51.0 | 10.1 | 121.1 | 90 | 23.5 | 19.6 | 0.79 | 3.27 | 0.098 | 0.094 | 3.27 | 0.131 |

$H_2O$ — deionized water
Buf — sodium bicarbonate
APS — ammonium persulfate
BHP — t-butylhydroperoxide
SFS — sodium formaldehyde sulfoxylate
BA — butyl acrylate
MMA — methyl methacrylate
SBV — sugar-based vinyl monomer
825 — Emulgator 825S (anionic; BASF)

TABLE 4

Emulsion Polymer Properties

| # | Monomers | Calculated $T_g$ (° C.) | Measured $T_g$ (° C.) | Theo Solids | Actual Solids | pH | F/T |
|---|---|---|---|---|---|---|---|
| 1 | EHA, MMA | −9 | −11 | 50.34 | 50.48 | 8.5 | Pass |
| 2 | EHA, MMA, SBV | −9 | −10 | 50.34 | 48.9 | 8.5 | Pass |
| 3 | BA, MMA | −6 | −4 | 50.55 | 50.13 | 9 | Pass |
| 4 | BA, MMA, SBV | −6 | −7 | 50.13 | 49.57 | 9 | Pass |
| 5 | BA | −54 | | 50.55 | 50.94 | 8.2 | Pass |
| 6 | BA, SBV | −54 | | 50.13 | 51.12 | 7.9 | Pass |
| 7 | MMA | 105 | | 50.55 | 54.18 | 8.3 | Pass |
| 8 | MMA, SBV | 105 | | 50.13 | 51.14 | 7.9 | Pass |
| 9 | BA, MMA | −6 | 5 | 59.95 | 60.18 | 4.1 | Fail |
| 10 | BA, MMA, SBV | −6 | −2 | 59.95 | 57.32 | 2.4 | Fail |

Example 5
Characterization Tests for the Polymers

Table 4 contains characterization data for the various example solutions. The characterization tests are described below:

The theoretical $T_g$ is the calculated glass transition temperature of the emulsion polymer based on the constituent monomers. The monomer weight fractions and known $T_g$'s of the corresponding homopolymers were used in the Flory-Fox estimation equation:

$$\frac{\omega_A}{Tg_A} + \frac{\omega_B}{Tg_B} + \ldots + \frac{\omega_N}{Tg_N} = \frac{1}{T_g}$$

Where: $\omega_A$-wt % of monomer A $Tg_A$-$T_g$ of monomer A in Kelvin $T_g$-Theoretical $T_g$ of copolymer in Kelvin The $T_g$ of the solution polymer was not taken into account in the calculation because of its low molecular weight. The actual $T_g$ for the fortified emulsion was determined by using a TA Instruments differential scanning calorimeter (DSC). A 20 mg sample of dried film was heated to 110° C., for 5 minutes to drive off any residual water and then cooled to −60° C. The temperature was increased at a constant rate of 10° C./minute and the enthalpy of the sample was recorded. The experimental $T_g$ value was recorded as the inflection point of the step transition and agree very well with calculated values.

Actual solids is the weight percent of solids in the final latex. Aluminum pans were heated at 110° C. in a vacuum oven for 30 minutes to volatilize any contaminants on the pan. The pans were cooled to room temperature and massed. 1 g of wet latex was added to the pans and the pans were massed again. The pans were heated in a vacuum oven at 110° C. for 30 minutes to remove the water and other volatile components (i.e., unreacted monomer). The pans, now containing the dried solids were massed again. The actual weight percent solids is calculated by dividing the solid mass by the liquid mass.

The theoretical solids were calculated by dividing all of the recipe solid masses, including the monomers, by the total recipe mass. The percent solids number is related to the conversion of the reaction because polymerized monomers are no longer volatile. An estimate conversion can be calculated by dividing the actual solids by the theoretical solids. Ideally, the actual weight percent solids of the final product should be equal to the theoretical to indicate complete conversion of the monomers.

The pH was measured by diluting 1 mL of latex with 10 mL of distilled water to avoid liquid junction potential associated with organic-aqueous mixtures.

The term freeze/thaw or F/T is used to denote the stability of the latex when exposed to multiple freeze/thaw cycles. 10 mL of latex was placed in a sealed vial. The vial was frozen in a freezer for several hours until solid and then thawed at room temperature. This constitutes one freeze/thaw cycle. The latex was exposed to 5 freeze/thaw cycles. If the final thawed latex exhibited the same visual characteristics as the original latex in terms of viscosity, stability, etc., it was considered to have passed the freeze/thaw test.

Example 6

Resin Fortified Emulsion Polymer in an Ink Formulation

The emulsion polymers of the present invention were evaluated for printing ink suitability and, specifically, as water-based flexographic inks. The polymers evaluated in ink formulations are described in Table 5.

TABLE 5

| EMULSION POLYMER DESIGNATION (From Examples 1–5) | MONOMERS IN EMULSION | INK WHERE USED |
|---|---|---|
| 9 | BA, MMA | A |
| 10 | BA, MMA, SBV | B |
| 3 | BA, MMA, J-584 | C |
| 4 | BA, MMA, SBV, J-584 | D |

This experimental selection allowed comparison of solution polymer (J-584, which is 30% Joncryl-678 (J-678) dissolved in amine/water at pH=9) fortified emulsions versus conventional emulsions and allowed comparison of sugar-based vinyl monomer containing emulsions versus systems which did not contain these monomers. All emulsions were prepared to the same $T_g$ of −6° C., 50–60% solids (the balance is water), and adjusted to an alkaline pH of 7.5 to 9.0.

Ink Preparation

The basic ink composition was as follows:

50 parts emulsion polymer (listed above)

40 parts Flexiverse aqueous pigment dispersion 5 parts isopropyl alcohol solvent 2 parts carbitol coalescing agent 0.5 parts aqueous polyethylene wax dispersion 2.5 parts ammonium hydroxide and distilled water to adjust ink pH to 8.5–9.0.

A vessel was charged with 50 g of polymer 3 with stirring at 150–200 rpm (using a Cowles type stirring blade in an OMNI Macro Mixer). 40 g of Sun Chemicals Dispersions Division Flexiverse BFD Blue 1121 aqueous pigment dispersion was added with stirring. 5 g of isopropyl alcohol, 2 g of carbitol, and 0.5 g of Shamrock Technologies Hydrocer EE 52 polyethylene wax (1 micron particle size) aqueous dispersion were added, in that order, with stirring. The ink pH was adjusted to 8.7 by addition of 0.5 g of concentrated ammonium hydroxide. 2 g of distilled water was added to bring the system to 100 parts and to adjust viscosity. Ink viscosity was measured at 22° C. using a calibrated #3 Zahn cup to yield a value of 24 seconds, corresponding to a viscosity of 150–175 cps.

The same procedure was used for all four polymers and the corresponding inks.

Examination of the prepared inks indicated a very slight degree of pigment flocculation in inks A and B, which had no solution polymer component in the emulsion. The only solution polymer component in those ink systems was from the Flexiverse pigment dispersion. It appeared that the fortified emulsion polymer based inks (C and D) were more uniform and stable than the other inks.

Ink Printing

All the prepared blue inks were printed at 400 fpm on treated (42 dynes/cm) polyethylene film and C1S (coated one side) paper. A modified PRUFBAU press was used for the flexographic printing. It was fitted with a PQS Cyrel plate, 32° trailing doctor blade, 6 BCM ceramic anilox with 360 lines per inch and 60° screen angle. All printed inks air-dried immediately.

Results of Ink Printing

In all cases, the inks transferred effectively to the substrates, with good print quality, color strength, and gloss (on the film). In general, the quality of the emulsion inks containing sugar-based vinyl monomer (B and D) was at least as good (slightly better) than the corresponding emulsion inks (A and C). The solution polymer fortified emulsion based inks (C and D) were at least as good (slightly better) than the corresponding non-fortified emulsion polymer based inks (A and B).

Adhesion of the inks to the film was measured after 24 hours using scotch tape. Adhesion of ink B was significantly better than ink A, and of ink D significantly better than ink C. This suggests that the presence of the sugar-based vinyl monomer component in the emulsion, whether fortified with solution polymer or not, improves adhesion of the resulting ink to polyethylene film.

SUMMARY

We demonstrated that emulsions comprising sugar-based vinyl monomer, and particularly fortified (with solution polymer) emulsions comprising a sugar-based vinyl monomer can be used in water-based printing inks. These inks were at least as good as the corresponding systems that did not comprise the sugar-based vinyl monomer. Advantages in terms of print quality and adhesion of the corresponding ink to polyethylene films may be contributed by the sugar-based vinyl monomer component.

Example 7

Additional Printing Experiments

The objective of this example was to repeat the evaluation of Example 6 and to study printing on various substances.

Ink Printing

All the prepared blue inks were printed at 400 fpm on treated (42 dynes/cm) polyethylene film, untreated polester (Mylar) film, and C1S (coated one side) paper. The polyethylene film was also printed at 1200 fpm. A modified PRUFBAU press was used for the flexographic printing. It was fitted with a PQS Cyrel plate, 32° trailing doctor blade, 6 BCM ceramic anilox with 360 lines per inch and 600 screen angle. All printed inks air-dried immediately.

The exact same conditions were also used (with slight variation on plate pressure) to print using a plate comprised of EPIC photopolymer, Atlas photopolymer and rubber. The test images on this multi-composition plate were designed to show print quality, dot and image resolution, transfer and accomodation of varying plate hardness.

Results of Ink Printing—Print Quality

In all cases, the inks transferred effectively to the substrates, with good print quality, color strength and gloss (on the film). In general, the quality of the sugar-based vinyl monomer containing emulsions inks were slightly better than the corresponding non-sugar-based emulsion inks. The solution polymer fortified emulsion based inks were slightly better than the corresponding non-fortified emulsion polymer based inks.

The test pattern print of polyethylene using the 3-component plate described above showed excellent transfer, dot quality, line resolution, color and gloss for all parts of the plate. This indicated the ink made from fortified emulsion using sugar-based vinyl monomer can provide a high quality print.

Results of Ink Printing—Adhesion

Adhesion of the inks to the films was measured after 24 hours using scotch tape. The results indicate that the presence of the sugar-based vinyl monomer component in the emulsion, whether fortified with solution polymer or not, improves adhesion of the resulting ink.

The adhesion benefits of macromer-containing emulsion ink was found on both treated (42 dynes/cm) polyethelene and untreated PET 942 dynes/cm).

Summary

The initial findings of Example 6, that sugar-based vinyl monomer (SBV) containing emulsions, and particularly that SBV-containing fortified emulsions can be used in water-based printing inks, were confirmed. The inks containing SBV were superior to the corresponding non-SBV containing systems.

Advantages of print quality and adhesion of the corresponding ink to polyethylene films were also confirmed.

The benefits were demonstrated both at 400 fpm and 1200 fpm print speed on treated PE film and at 400 fpm on C1S paper.

The benefits of SBV-containing water-based flexo ink over the corresponding non-SBV controls were also found on untreated polyester (PET) film.

We claim:

1. An ink comprising a pigment and resin-fortified emulsion polymer comprising a sugar-based vinyl monomer, a resin and at least one emulsion-polymerizable monomer wherein the sugar-based vinyl monomer is selected from the group consisting of alkyl polyglycoside maleic acid ester monomers with a DP ranging from 1.2 to 2 and a DS from 1.5 to 2.

2. The ink of claim 1 wherein the polymer comprises an effective amount of at least one support resin for controllably affecting the physical characteristics of the emulsion polymer product, the resin being selected from the group consisting of water soluble resins, water dispersible resins, alkali soluble resins, alkali dispersible resins and mixtures thereof, the resin having been produced either by solution-polymerization method or by a bulk-polymerization method wherein the resin is produced from at least one ethylenically-unsaturated monomer selected from the group consisting of olefins, mono vinylidene aromatics, alpha beta ethylenically-unsaturated carboxylic acids and esters thereof, ethylenically-unsaturated dicarboxylic anhydrides, and mixtures thereof.

3. The ink of claim 1 wherein the resin has a number average molecular weight of from about 500 to about 20,000.

4. The ink of claim 1 wherein the emulxion polymerizable monomer is an ethylenically unsaturated monomer selected from the group consisting of olefins, monovinylidene aromatics, alpha beta ethylenically unsaturated carboxylic acids, esters of alpha beta ethylenically unsaturated carboxylic acids, ethylenically unsaturated dicarboxylic anhydrides, halo substituted olefins and mixtures thereof.

5. The ink of claim 1 wherein the emulsion polymerizable monomers are selected from the group consisting of 2-ethylhexylacrylate, methylmethacrylate and butyl acrylate.

6. The ink of claim 1 wherein the emulsion polymer product promotes recycling and is repulpable or biodegradable.

* * * * *

UNITED STATES PATENT AND TRADEMARK OFFICE
CERTIFICATE OF CORRECTION

PATENT NO.     : 6,355,734 B1
DATED          : March 12, 2002
INVENTOR(S)    : Scott E. Cassar et al.

It is certified that error appears in the above-identified patent and that said Letters Patent is hereby corrected as shown below:

<u>Columns 5 and 6,</u>
Table 2: "base" should read -- <u>base</u> --.

<u>Column 9,</u>
Line 26, "110°C., for 5" should read -- 110°C for 5 --.

<u>Column 11,</u>
Line 45, "600" should read -- 60°L --.

<u>Column 12,</u>
Line 9, "942 dynes/cm)." should read -- (942 dynes/cm). --.
Line 53, "emulxion" should read -- emulsion --.

Signed and Sealed this

First Day of October, 2002

Attest:

Attesting Officer

JAMES E. ROGAN
*Director of the United States Patent and Trademark Office*